H. BORCHARDT.
BALL BEARING.
APPLICATION FILED SEPT. 19, 1907.

927,937.

Patented July 13, 1909.

WITNESSES:
Fred White
H. H. Wallace

INVENTOR:
Hugo Borchardt,
By his Attorneys
Arthur C. Fraser & Usina

UNITED STATES PATENT OFFICE.

HUGO BORCHARDT, OF BERLIN-CHARLOTTENBURG, GERMANY.

BALL-BEARING.

No. 927,937.  Specification of Letters Patent.  Patented July 13, 1909.

Application filed September 19, 1907. Serial No. 393,588.

*To all whom it may concern:*

Be it known that I, HUGO BORCHARDT, a citizen of the United States of North America, residing at No. 31 Kantstrasse, Berlin-Charlottenburg, in the Kingdom of Prussia, Germany, have invented certain new and useful Improvements Relating to Ball-Bearings, of which the following is a full, clear, and exact description.

The present invention relates to ball bearings of that kind in which holes or openings permitting the insertion or removal of the balls are provided in the race rings and extend to the ball races from the exterior of the bearing at the side thereof. Hitherto it has been usual to close said openings by means of a screw plug which plug either of itself completed the groove for the balls or a special filling piece was provided inserted from the side.

According to the present invention a retainer is employed which is held in position without the use of a screw by its own spring action and in which in order to prevent any accidental loosening of the same, a groove is provided in the race ring within which the retainer engages with a spring action while studs at its ends or other supporting points engage recesses therein. In this manner the retainer is prevented from falling out of the bearing when working but on the contrary as soon as it is inserted into its position it will maintain the bearing unalterable even under the most unfavorable conditions and under the heaviest loads to be taken into consideration.

In the accompanying drawings two forms of construction are shown by way of example.

Figure 1:
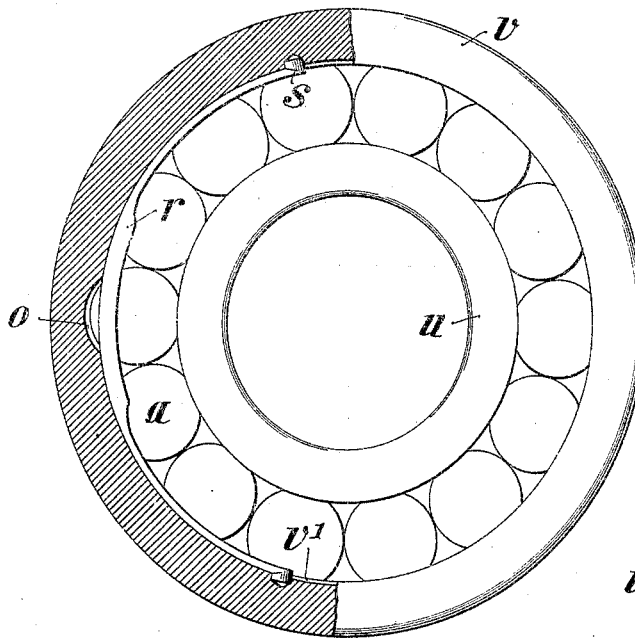
Figure 2:
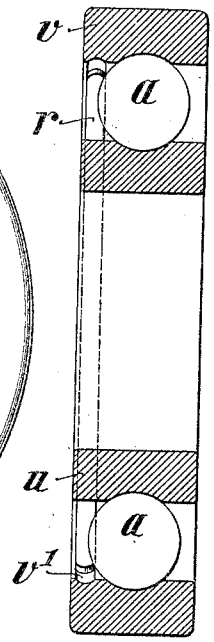
Figure 3:
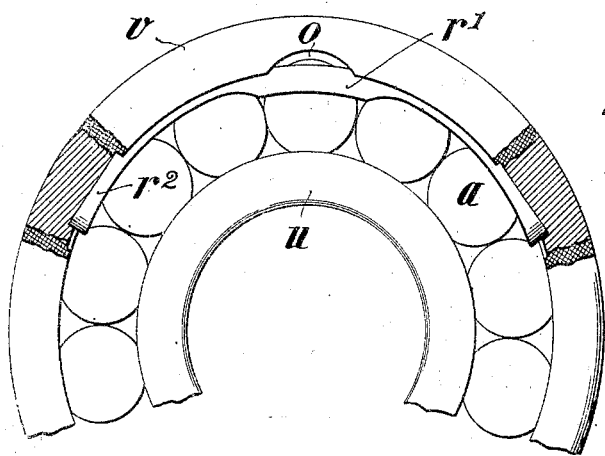

Figure 1 is a side elevation partly in section of a bearing having the present invention applied thereto. Fig. 2 is a vertical transverse section thereof. Fig. 3 is a similar view to Fig. 1 illustrating a modification and Fig. 4 is a vertical transverse section thereof.

In the example given at Figs. 1 and 2 is shown an arrangement of a ball bearing provided with a retainer constructed according to the present invention in which the hole or opening $o$ for the insertion and removal of the balls $a$ is situated in the outer one of the rings $u$ and $v$. In this case the retainer $r$ consists of a spring bow which is held by short supporting studs or pins $s$ engaging in corresponding recesses in the ring $v$. This bow at the position of the opening $o$ is somewhat thickened on both sides and engages in a corresponding groove $v^1$ in the ring $v$.

Figure 4:
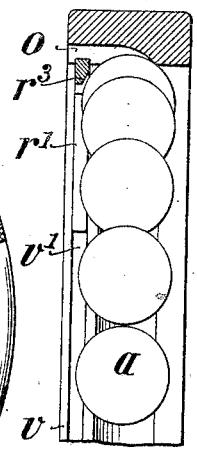

In the modification shown at Figs. 3 and 4 the parts have essentially the same form as in Figs. 1 and 2 but the supporting pins $s$ are dispensed with and the supporting points for the retaining bow $r^1$ in the ring $v$ are formed by enlarging the ends of the bow itself to form counter-support surfaces $r^2$.

It may be pointed out that the special form of construction of the ball bearing itself is of no importance for the invention and that naturally the retainer may be employed either for the outer or for the inner ring or for both. The retainer may extend around the bearing to any desired extent.

What I claim as my invention, and desire to secure by patent is:

In a ball bearing having an opening for the insertion of the balls, a spring bow like retainer for preventing the balls from falling out of the opening in the ring, said retainer having stud like or enlarged ends, and a groove provided in the corresponding ring within or behind which groove the retainer engages with spring action so that it is maintained constantly and securely in position substantially as herein shown and described and for the purpose stated.

In witness whereof I have hereunto signed my name in the presence of two subscribing witnesses.

HUGO BORCHARDT.

Witnesses:
WOLDEMAR HAUPT,
WILLIAM MAYNER.